United States Patent
Maguire et al.

(10) Patent No.: US 7,437,857 B1
(45) Date of Patent: Oct. 21, 2008

(54) COMPRESSION ANCHOR

(75) Inventors: John P. Maguire, Missoula, MT (US); Paul H. Greenwood, Missoula, MT (US)

(73) Assignee: Spectrum Products, LLC

( * ) Notice: Subject to any disclaimer, the term of this patent is extended or adjusted under 35 U.S.C. 154(b) by 788 days.

(21) Appl. No.: 10/782,515

(22) Filed: Feb. 11, 2004

(51) Int. Cl.
| | |
|---|---|
| E02D 5/74 | (2006.01) |
| E02D 27/00 | (2006.01) |
| E02D 27/32 | (2006.01) |
| E02D 27/42 | (2006.01) |
| E04B 1/38 | (2006.01) |
| E04C 5/00 | (2006.01) |
| A45F 3/44 | (2006.01) |
| F16M 13/00 | (2006.01) |
| E04G 3/00 | (2006.01) |
| E06C 9/00 | (2006.01) |
| F16B 7/04 | (2006.01) |

(52) U.S. Cl. .............. 52/298; 52/155; 52/296; 52/297; 52/704; 248/156; 248/530; 182/87; 182/93; 403/370; 403/371; 403/372

(58) Field of Classification Search ............ 52/154, 52/155, 248, 296, 298, 704, 707, 708, 40, 52/165, 170, 301, 297; 76/110; 81/461; 4/504, 511; 182/87, 93; 248/156, 508, 530, 248/533, 541, 903; 403/370, 371, 372
See application file for complete search history.

(56) References Cited

U.S. PATENT DOCUMENTS

| | | | | |
|---|---|---|---|---|
| 3,042,161 A | * | 7/1962 | Meyer, Jr. ............... | 52/166 |
| 3,685,237 A | * | 8/1972 | Johnson .................. | 52/98 |
| 3,769,768 A | * | 11/1973 | Bertrand ................. | 52/154 |
| 3,894,375 A | * | 7/1975 | Lindberg, Jr. ............ | 52/298 |
| 3,972,077 A | | 8/1976 | Whitten, Jr. ............. | 4/172 |
| 4,059,934 A | * | 11/1977 | Hayamizu ............... | 52/297 |
| 4,107,826 A | | 8/1978 | Tysdal ................... | 24/243 K |
| 4,497,152 A | * | 2/1985 | Weissner ................ | 52/709 |
| 4,552,245 A | * | 11/1985 | Lindberg, Jr. ............ | 182/97 |
| 4,729,331 A | | 3/1988 | Eggleston ............... | 114/230 |
| 4,829,732 A | | 5/1989 | Dahowski ............... | 52/298 |
| 4,834,015 A | | 5/1989 | Alpert ................... | 114/294 |
| 4,953,269 A | | 9/1990 | Ragsdale ................ | 24/704.1 |
| 4,962,285 A | * | 10/1990 | Baker .................... | 174/6 |
| 5,040,251 A | * | 8/1991 | Hanford ................. | 4/496 |

(Continued)

OTHER PUBLICATIONS

Staff. "Product News; Latest and Greatest Offerings in the Engineering Marketplace." Design News 54.2 (1999): 99.*

Primary Examiner—Brian Glessner
Assistant Examiner—Branon C Painter
(74) Attorney, Agent, or Firm—Shane P. Coleman; Holland & Hart LLP

(57) ABSTRACT

A compression anchor for holding a support member, such as a cylindrical handrail, is disclosed. The anchor includes a body having a cavity and a wedge portion that connects to the body using thick threads, such as 2-4 ACME 2-G threads. The wedge is substantially cylindrical and encircles a support member received in the cavity. A compression ring is in contact with the body and the wedge portion. As the wedge portion turns relative to the body using the threads, the compression ring expands and contracts to loosen or tighten the connection between the received support member and the anchor. The wedge portion and the body are corrosion resistant.

30 Claims, 13 Drawing Sheets

U.S. PATENT DOCUMENTS

| | | | |
|---|---|---|---|
| 5,067,213 A | 11/1991 | Ragsdale | 24/704.1 |
| 5,104,273 A | 4/1992 | Clark | 411/366 |
| 5,184,377 A | 2/1993 | Ragsdale | 24/704.1 |
| 5,571,229 A * | 11/1996 | Fitzsimmons et al. | 473/481 |
| 5,660,013 A | 8/1997 | Saldarelli et al. | 52/296 |
| 5,695,297 A * | 12/1997 | Geib | 403/371 |
| 5,752,349 A * | 5/1998 | Fitzsimmons et al. | 52/165 |
| 5,800,089 A | 9/1998 | Donaton | 403/393 |
| 6,045,289 A * | 4/2000 | Tseng | 403/205 |
| 6,050,034 A * | 4/2000 | Krinner | 52/155 |
| 6,202,369 B1 * | 3/2001 | Partee et al. | 52/165 |
| 6,565,279 B1 | 5/2003 | Skovronski et al. | 403/192 |
| 6,684,588 B1 | 2/2004 | Jones | 52/298 |
| 7,150,579 B2 * | 12/2006 | Newton | 404/11 |
| 7,175,001 B2 * | 2/2007 | Jeon | 187/272 |

* cited by examiner

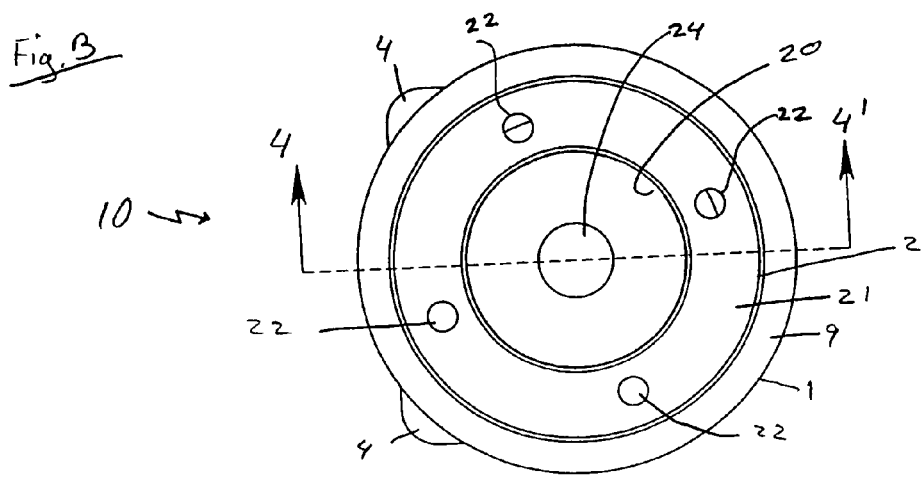
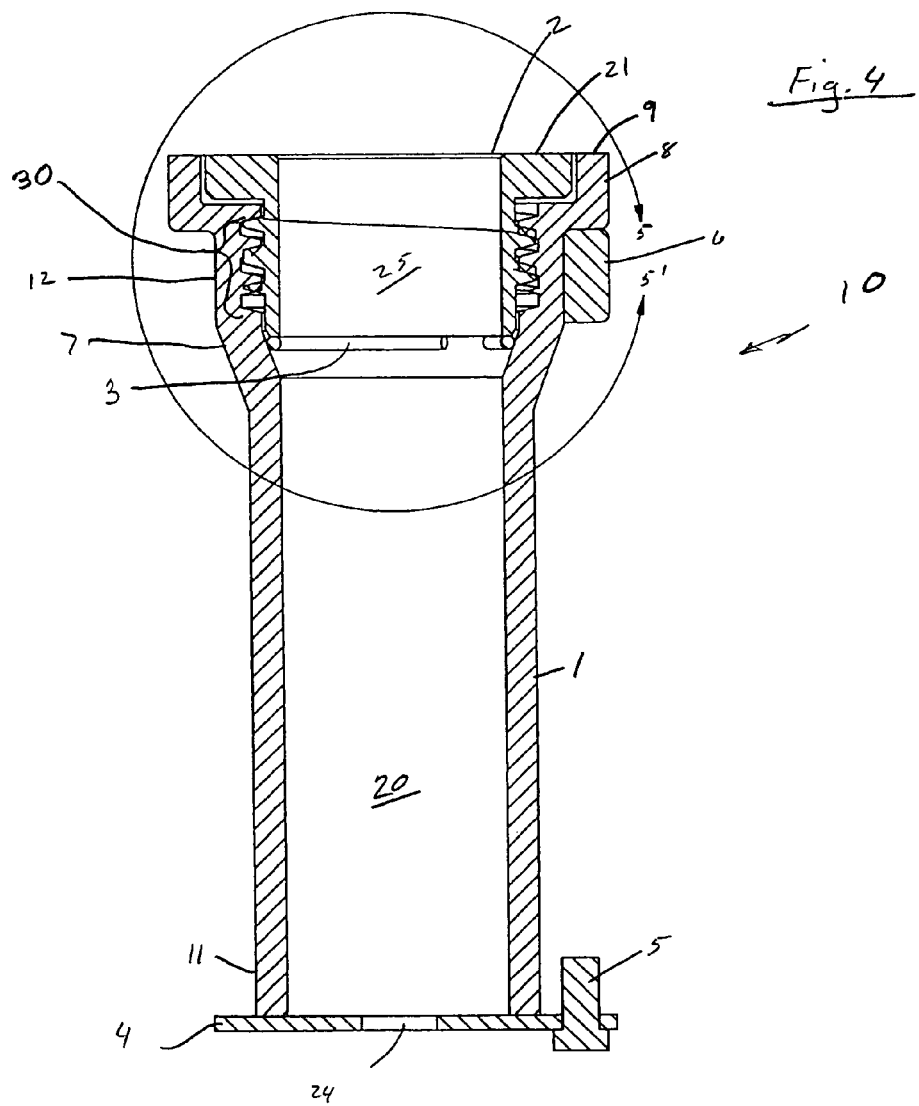

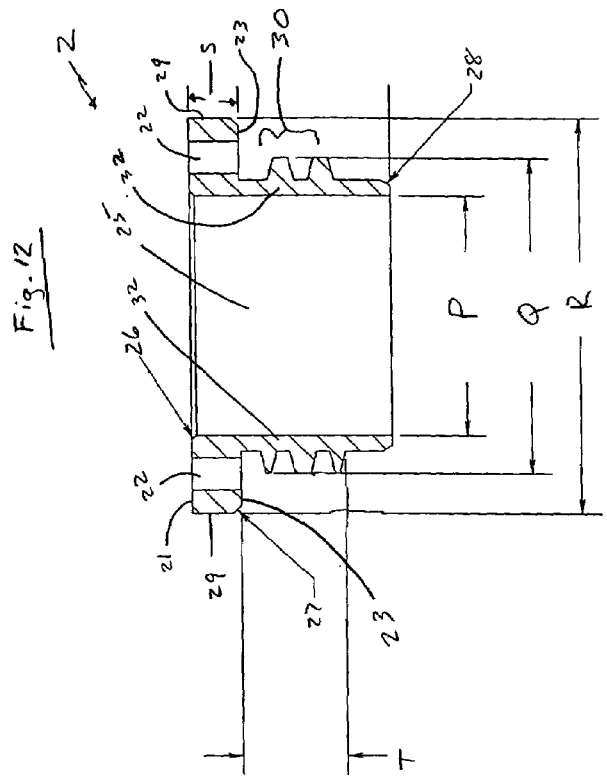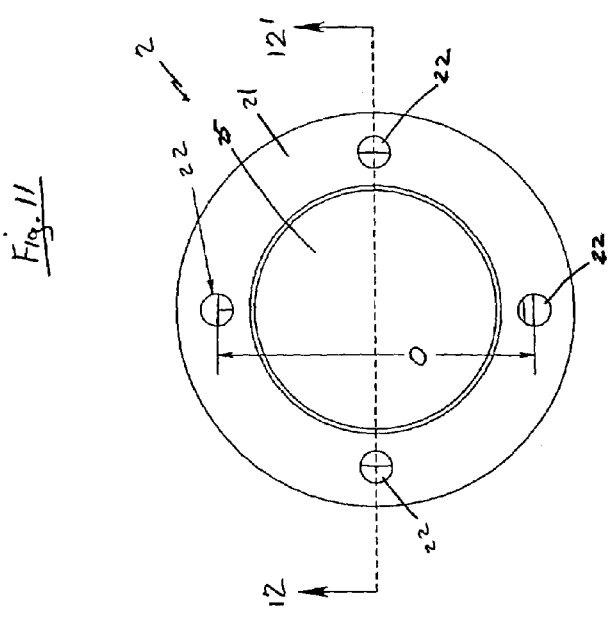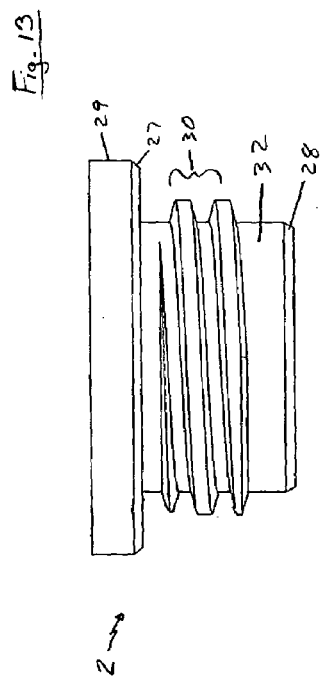

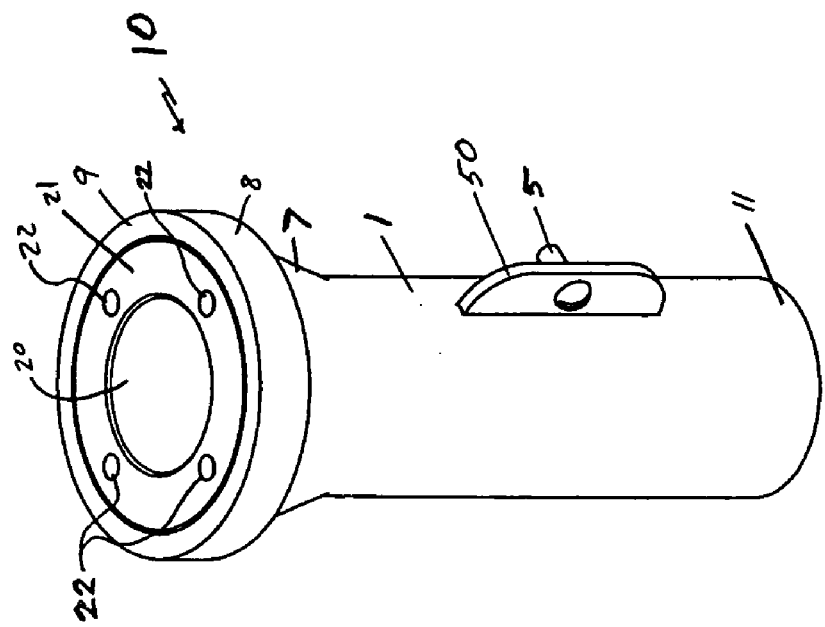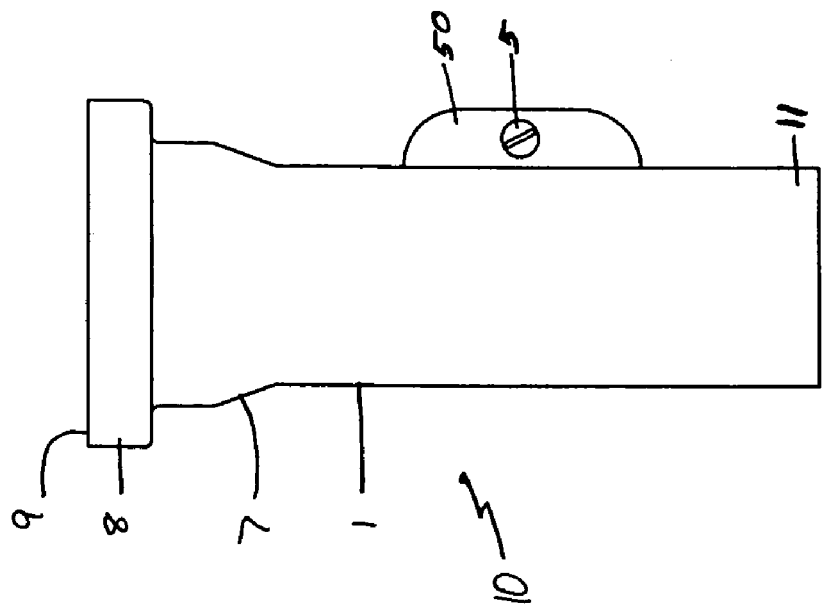

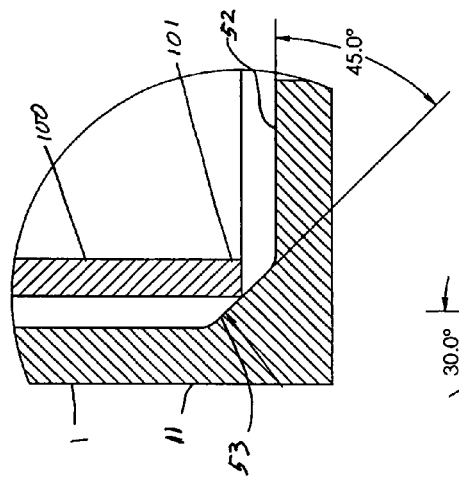
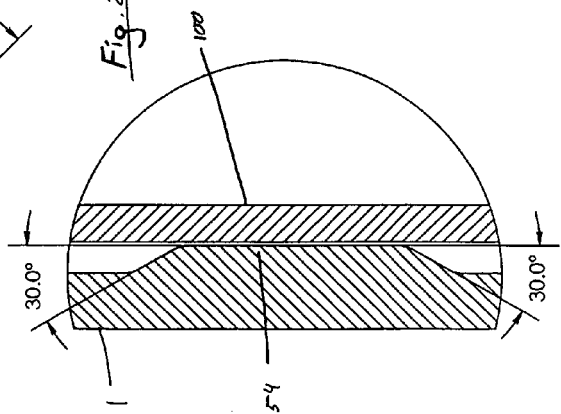
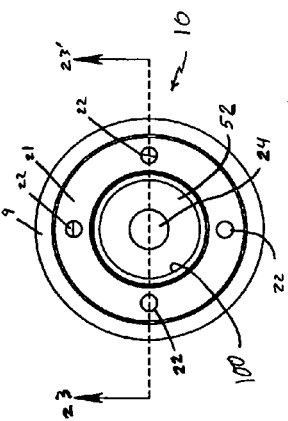
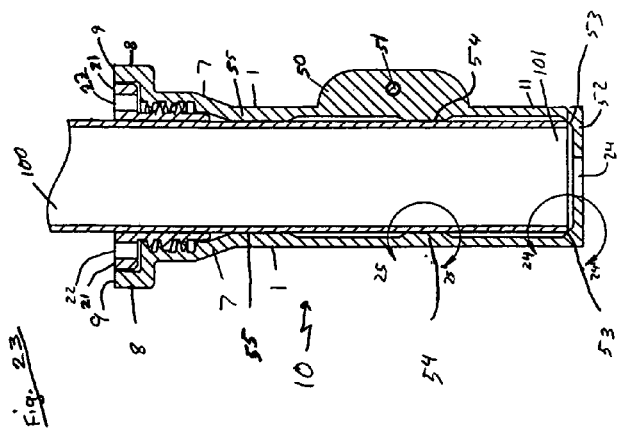

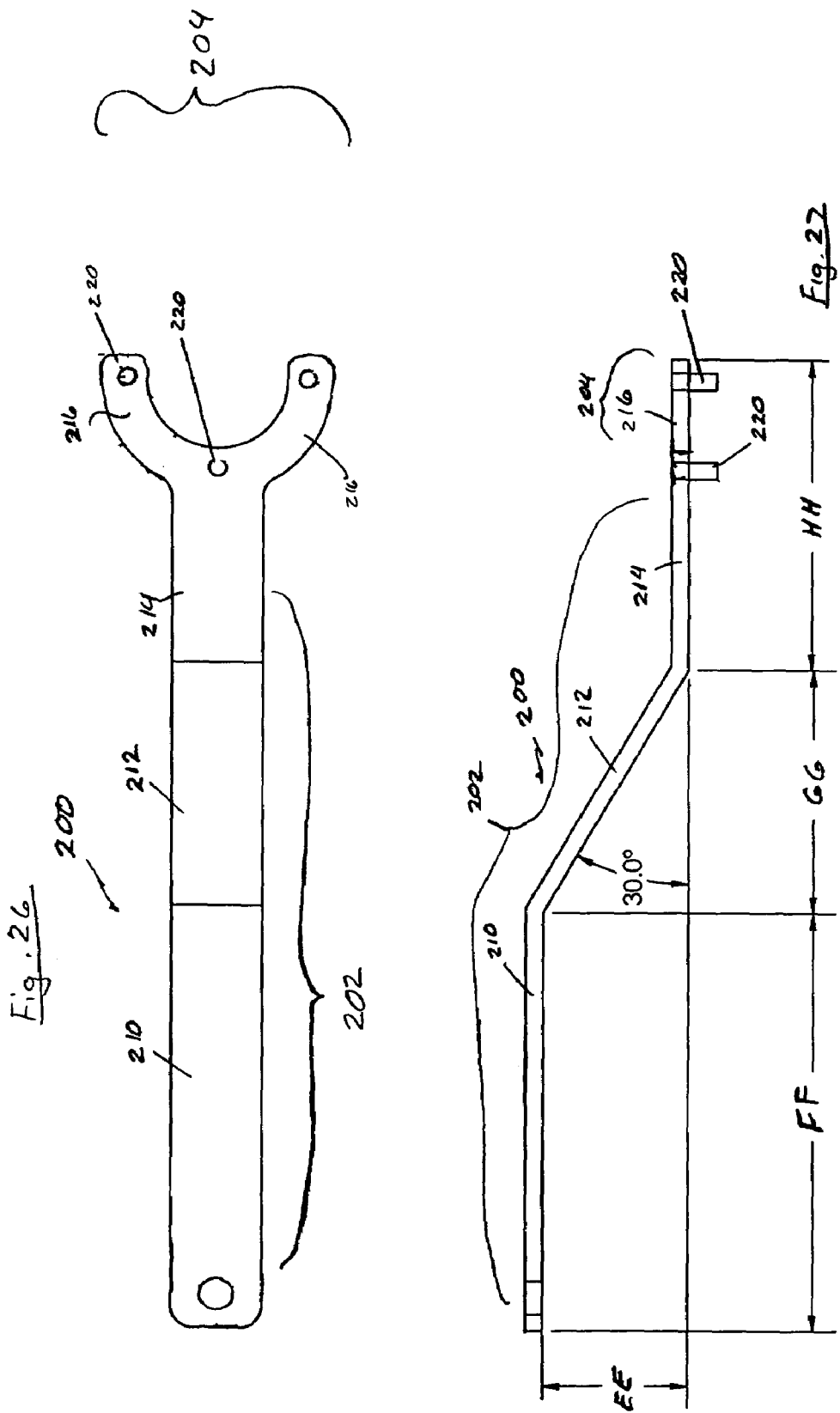

COMPRESSION ANCHOR

FIELD OF INVENTION

The present invention relates generally to an anchor for supporting a swimming pool accessory, such as a handrail, chair, platform, or diving board. More particularly, it relates to a corrosion-resistant compression anchor.

BACKGROUND

In the field of handrails and support accessories, such as swimming pool accessories, it is desirable to anchor supports, such as handrails, chairs, lifeguard platforms, diving boards and platforms, and starting platforms, into a ground surface, such as a pool deck. A typical handrail or support is cylindrical, approximately 1.9 inches in diameter. Various means are known for anchoring such supports into a pool deck or other ground surface. One such means is the use of a metal anchor that is embedded in the ground surface, for example, by installing the anchor during the construction of the pool deck by pouring the concrete or other pool surface around the anchor. Anchors receive the support member and hold it in place. Existing compression anchors, for example, utilize a compression ring that wraps around the cylindrical support when the support member is received in a cylindrical cavity of the anchor. The compression ring can be tightened to hold the support member in place and can be loosened to release the support member.

The use of existing anchors in a wet environment, such as around a swimming pool, poses particular problems. Because the water corrodes many metal materials, hand rails and other supports use stainless steel to present a clean, rust-free appearance. Conventional compression anchors, however, are formed from bronze or other material that tarnishes. When two pieces of stainless steel are pressed tightly together, a permanent bond may be formed. In the case of a support member and an anchor, this is undesirable because one purpose of the anchor is to allow the support structure to be removed from the anchor; if a permanent connection was intended, the support structure would be permanently mounted in the ground surface during construction and there would be no reason to use an anchor. As a result, existing anchors are formed from metal other than stainless steel, such as bronze.

One problem with the use of bronze and other materials is that they tarnish in a wet or damp environment. As a result, existing anchor systems include a stainless steel escutcheon plate that wraps around the support and covers the exposed portion of the anchor. The escutcheon plate is undesirable in many applications because it rises above the ground surface and because it is another piece of construction material that must be purchased and installed. What is needed is an improved compression anchor.

SUMMARY

A compression anchor for holding a support member, such as a cylindrical handrail, is disclosed. The anchor includes a body having a cavity and a wedge portion that connects to the body using thick threads, such as 2-4 ACME-2G threads. The wedge is substantially cylindrical and encircles a support member received in the cavity. A compression ring is in contact with the body and the wedge portion. As the wedge portion turns relative to the body using the threads, the compression ring expands and contracts to loosen or tighten the connection between the received support member and the anchor. The wedge portion and the body are corrosion resistant.

An anchor is also disclosed for supporting a cylindrical support member. The anchor includes means for receiving the support member and means for releasably securing the support member in the anchor by compressing a compression ring around the support member in response to a torsional force exerted on the means for receiving. The anchor also includes means for preventing the anchor from moving relative to a ground surface in which the support member is positioned, in response to the torsional force.

An anchor is also disclosed having a body and a wedge portion. The body defines a cylindrical cavity having a length in the range of 4-6 inches. The wedge portion connects to the body and includes an upper surface having a plurality of holes defined therein. The holes receive complementary pins on a key that is used to rotate the wedge portion relative to the body. The wedge portion encircles a support member received in the cavity. The upper surface of the wedge portion is substantially flush with an upper end of the body when the support member is received and secured in the cavity.

SUMMARY OF DRAWINGS

The detailed description will refer to the following drawings, wherein like numerals refer to like elements, and wherein:

FIG. 3 shows a top view of the compression anchor;

FIG. 4 shows a cross-section of the wedge anchor shown in FIG. 3, taken along the line 4-4';

FIG. 11 shows a top view of the wedge portion of the anchor;

FIG. 12 shows a cross-section of the wedge portion shown in FIG. 11, taken along the line 12-12';

FIG. 13 shows a side view of the wedge portion;

FIG. 18 shows a perspective view of another embodiment of the anchor with an anti-rotation tab positioned approximately midway along the length of the body;

FIG. 19 shows a side view of the anchor shown in FIG. 18;

FIG. 22 shows a top view of the anchor and support member shown in FIGS. 20 and 22;

FIG. 23 shows a cross-section of the anchor and support member shown in FIG. 22, taken along the line 23-23';

FIG. 24 shows a more detailed view of the chamfered bottom corner shown in FIG. 23;

FIG. 25 shows a more detailed view of one of the spacers that extends into the cylindrical cavity and abuts the support member;

FIG. 26 shows a bottom view of a key used to rotate the wedge portion relative to the body of the anchor; and FIG. 27 shows a side view of the key shown in FIG. 26.

DETAILED DESCRIPTION

Figure 1:
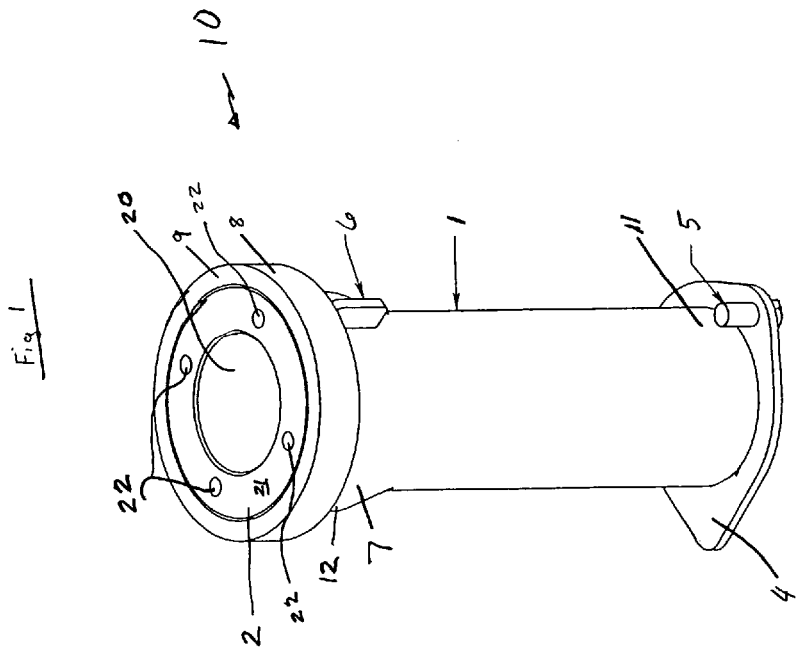
FIG. 1 shows a compression anchor adapted to hold a support such as a cylindrical handrail for use in connection with a swimming pool.

FIG. 1 shows a compression anchor 10 adapted to hold a support member such as a cylindrical handrail for use in connection with a swimming pool. The anchor 10 includes a body 1 having an upper end 12 and a lower end 11. The lower end 11 is connected to a bottom plate 4. The base plate 4 also includes an electrical grounding connection 5, such as a screw. The upper end 12 of the body 1 is connected to a rim 8. The upper end 12 of the body 1 is wider in diameter than the rest of the body 1, as the body 1 tapers at a tapered portion 7 outward. An anti-rotation tab 6 is connected to the anchor body 1 to provide stability to the anchor body 1 and to prevent the anchor body 1 from rotating relative to the ground surface when the wedge portion 2 is turned to tighten and loosen the wedge 2, as described herein. In one embodiment, the anti-rotation tab 6 is substantially flat and extends outward from the body 1.

The upper surface 9 of the rim 8 of the anchor body 1 is substantially flat. In one embodiment, the anchor 10 is fixedly connected to a ground surface, and the upper surface 9 of the rim 8 is positioned substantially flush with the surface, such as a pool deck. The compression anchor 10 defines a cylindrical cavity 20 for receiving a support (not shown).

In use, the wedge portion 2 connects to the body 1 via threads. The wedge portion 2 is tightened or loosened to connect or disconnect a support member (not shown) received in the cylindrical cavity 20. A compression ring (not shown) is disposed inside the cylindrical cavity 20. As the wedge portion 2 is tightened relative to the body 1, the wedge portion 2 moves downward in the embodiment shown in FIG. 1, thereby compressing the compression spring (not shown) against an interior wall of the tapered portion 7 of the anchor body 1. The wedge portion 2 includes an upper surface 21 that is substantially flat. In one embodiment, the upper surface 21 is substantially flush with the upper surface 9 of the anchor body 1 when the support (not shown) is tightened into place. The wedge portion 2 also includes holes 22 defined in the upper surface 21. The holes 22 receive a key (not shown) that is used to tighten and loosen the wedge portion 2 relative to the body 1 of the anchor 10.

Figure 2:
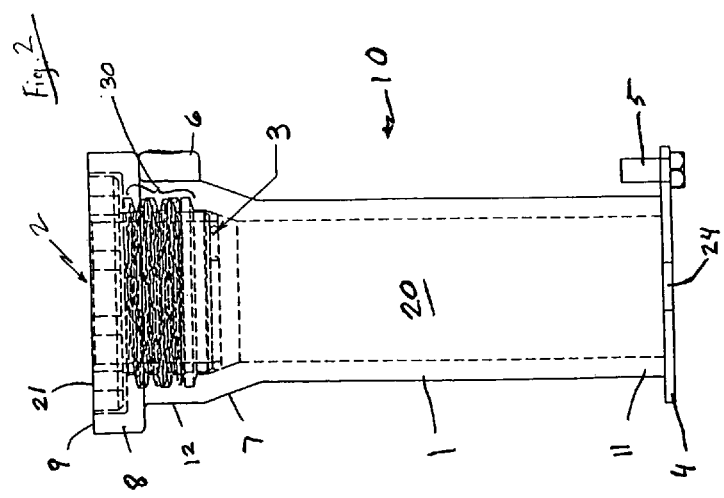
FIG. 2 shows a side view of the anchor shown in FIG. 1.

FIG. 2 shows a side view of the anchor 10 shown in FIG. 1, including the interior walls and structures of the anchor 10 shown in phantom lines. In the example of FIG. 2, the bottom plate 4 includes a hole 24 defined therein. The hole 24 is generally aligned with a central axis of the wedge body 1, in communication with the cylindrical cavity 20. The wedge portion 2 is connected to the inside of the body 1 via threads 30. As shown in FIG. 2, the compression ring 3 in positioned inside the cylindrical cavity 20 at the tapered portion 7 of the body 1. As the wedge portion 2 is tightened downward into position, the compression ring 3 compresses, thereby engaging a support member that is received in the cylindrical cavity 20. In the example of FIG. 2, the wedge portion 2 has been tightened into position and the upper surface 9 of the rim 8 of the anchor body 1 is substantially flush with the upper surface 21 of the wedge portion 2.

FIG. 3 shows a top view of the compression anchor 10. In the example of FIG. 3, the hole 24 in the bottom of the base plate 4 is generally concentric with a longitudinal axis of the cylindrical cavity 20. Due to the shape of the bottom plate 4 in the example of FIG. 3, portions of the bottom plate 4 extend into view at the left side of FIG. 3. The top surface 21 of the wedge portion 2 includes four holes 22 in the example of FIG. 3. The holes 22 may be used in connection with a key (not shown) to engage and disengage the wedge portion 2 with the body 1 of the compression anchor 10.

FIG. 4 shows a cross-section of the wedge anchor 10 shown in FIG. 3, taken along the line 4-4'. As shown in FIG. 4, the compression ring 3 is a generally cylindrical ring formed, for example, from metal that is positioned at the inner side of the tapered portion 7 of the anchor body 1. An example of FIG. 4 the wedge portion 2 has completely engaged the anchor body 1 using the threads 30. The wedge portion 2 is turned into position such that the upper surface 21 of the wedge portion 2 is substantially flush with the top surface 9 of the rim 8 of the anchor body 1, in this example.

Figure 5:
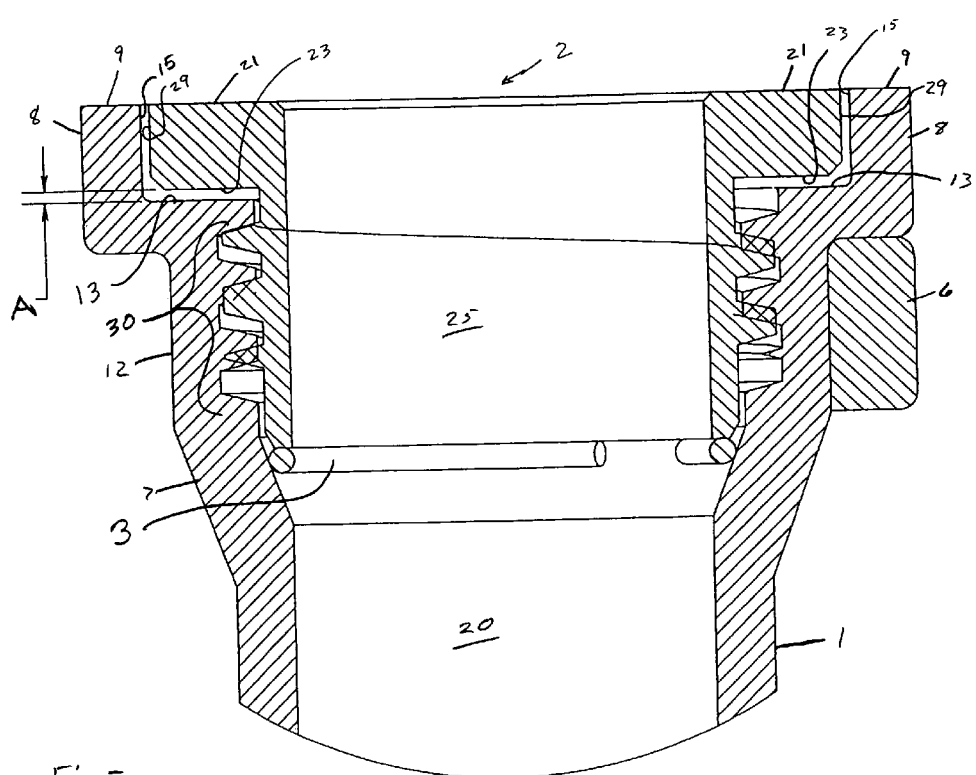
FIG. 5 shows an enlarged view of the cross-section of the upper portion of the anchor identified in FIG. 4 by the area 5-5'.

FIG. 5 shows an enlarged view of the cross-section of the upper portion of the anchor 10 identified in FIG. 4 by the area 5-5'. As illustrated in FIG. 5, the rim 8 of the body 1 includes an inner sidewall 15. The inner sidewall 15 is spaced from the outer wall 29 of the wedge portion 2. The rim 8 also include an inner horizontal surface 13 which is spaced from a lower surface 23 of the wedge portion 2 when the wedge portion engages the threads of the body 1. In the example of FIG. 5, the lower side 23 of the wedge portion 2 is spaced from the inner horizontal surface 13 of the body 1 by a distance A. In one embodiment, the distance A is in the range of 0.01 to 0.10 inches. In one particular embodiment, the distance A is 0.040 inches.

Figure 6:
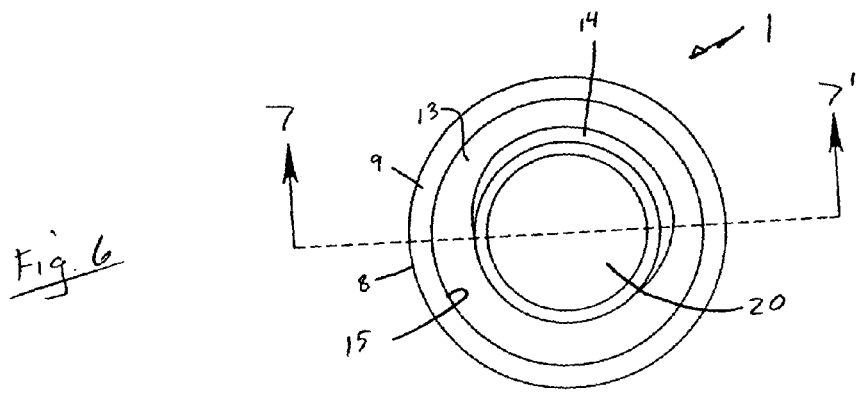
FIG. 6 shows a top view of the anchor body, with the wedge portion.

FIG. 6 shows a top view of the anchor body 1, without the wedge portion (2 in FIG. 1). As shown, the body 1 includes an upper side 9 of the rim 8. The rim 8 also includes an inner sidewall 15 and an inner horizontal surface 13. Threads 14 are used to engage the wedge portion (2 in FIG. 1).

Figure 7:
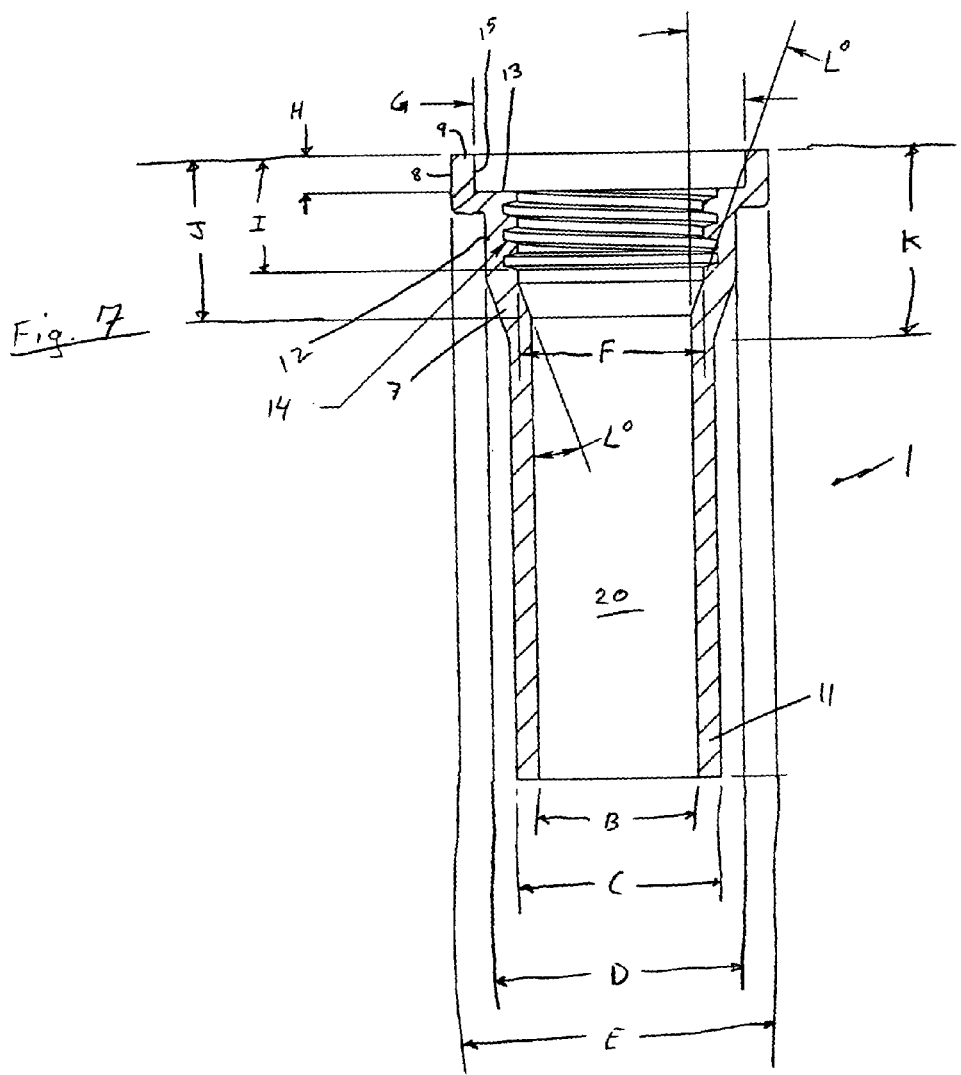
FIG. 7 shows a cross-section view of the body portion shown in FIG. 6 taken along the line 7-7'.

FIG. 7 shows a cross-section view of the body portion 1 shown in FIG. 6 taken along the line 7-7'. In the example of FIG. 7, the inner diameter between the inner walls 15 of the rim 8 of the body 1 is shown by the distance G. In one embodiment, G is in the range of 2.5 to 2.6 inches. In one particular embodiment, the distance G is 2.565 inches, plus or minus 0.005 inches of tolerance. The height of the rim 8 from the inner horizontal surface 13 to the top surface 9 is given by the distance H. In one example, H is in the range of 0.3 inches 0.4 inches. In one particular embodiment, the distance H is approximately 0.352 inches. The distance from the top surface 9 of the rim 8 to the lower most thread 14 is given by the distance I. In one embodiment, the distance I is in the range of 1.0 inches to 1.2 inches. In one particular embodiment, the distance I is approximately 1.102 inches. The distance from the top surface 9 of the rim 8 to the lower end of the inside of the tapered portion 7 is given by the distance J. In one embodiment, the distance J is in the range of 1.000 to 2.000 inches. In one particular embodiment, the distance J is approximately 1.561 inches. The distance from the top surface 9 to the bottom of the tapered portion 7 measured on the outside of the body 1 is given by the distance K. In one embodiment, the distance K is approximately 1.801 inches. In the example of FIG. 7, the tapered portion 7 tapers relative to the rest of the body 1 by an angle L-degrees. In one embodiment, the angle L-degrees is in the range of 10 degrees to 30 degrees. In one particular embodiment, the angle L is approximately 20 degrees. The inner diameter of the cylindrical cavity 20 is given by the distance B.

In one embodiment, the anchor 10 is used to support a 1.5 inch handrail used in connection with a swimming pool or pool deck area. In this example, the distance B is in the range of 1.500 to 1.600 inches. In one particular embodiment, the diameter B is 1.515 to 1.520 inches. The outside diameter of the body 1 is shown by the distance C in the example of FIG. 7. In one example, the distance C is in the range of 1.900 to 2.000 inches. In one particular embodiment, the distance C is approximately 1.940 inches. The outer diameter of the upper portion 12 of the body 1 is shown by the distance D in the example of FIG. 7. In one example, the distance D is in the range of 2.250 to 2.500 inches. In one particular embodiment, the distance D is approximately 2.377 inches. The outer diameter of the rim 8 is shown as the distance E in the example of FIG. 7. In one example, the distance E is in the range of 2.750 to 3.250 inches. In one particular embodiment, the distance E is approximately 3 inches.

Figure 8:
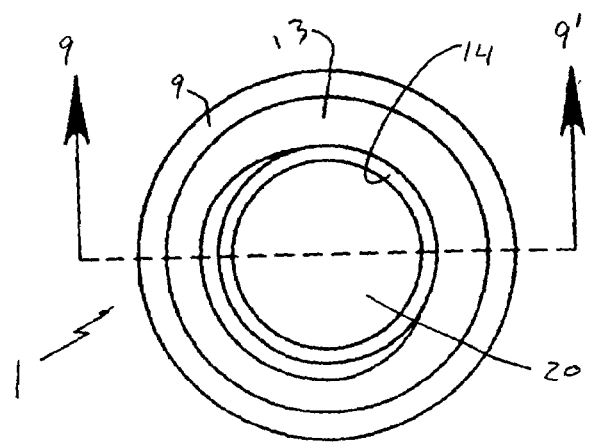
FIG. 8 shows a top view of the body of the anchor.
Figure 9:
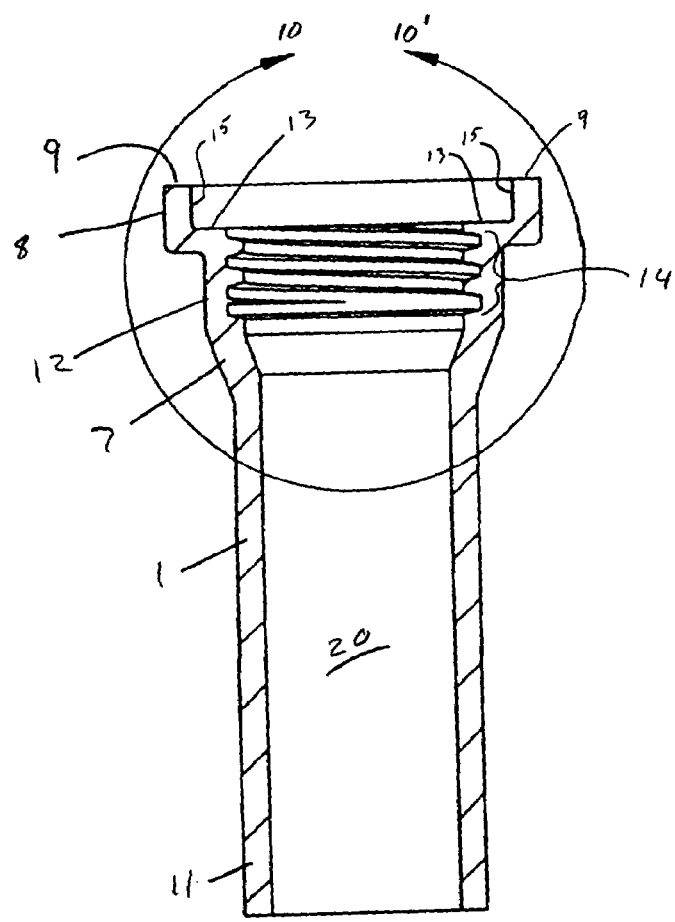
FIG. 9 shows a cross-section of the body shown in FIG. 8.

FIG. 8 shows a top view of the body 1 of the anchor 10. FIG. 9 shows a cross-section of the body 1 shown in FIG. 8, taken along the line 9-9'. As shown in FIG. 9, the body 1 includes the cylindrical cavity 20. Threads 14 are formed in the upper portion 12 of the body. A tapered portion 7 tapers such that the upper portion 12 has a diameter that is wider then the lower portion 11 of the body 1. The rim 8 of the body 1 includes an upper surface 9, and inner surface 15, and an inter horizontal surface 13.

Figure 10:
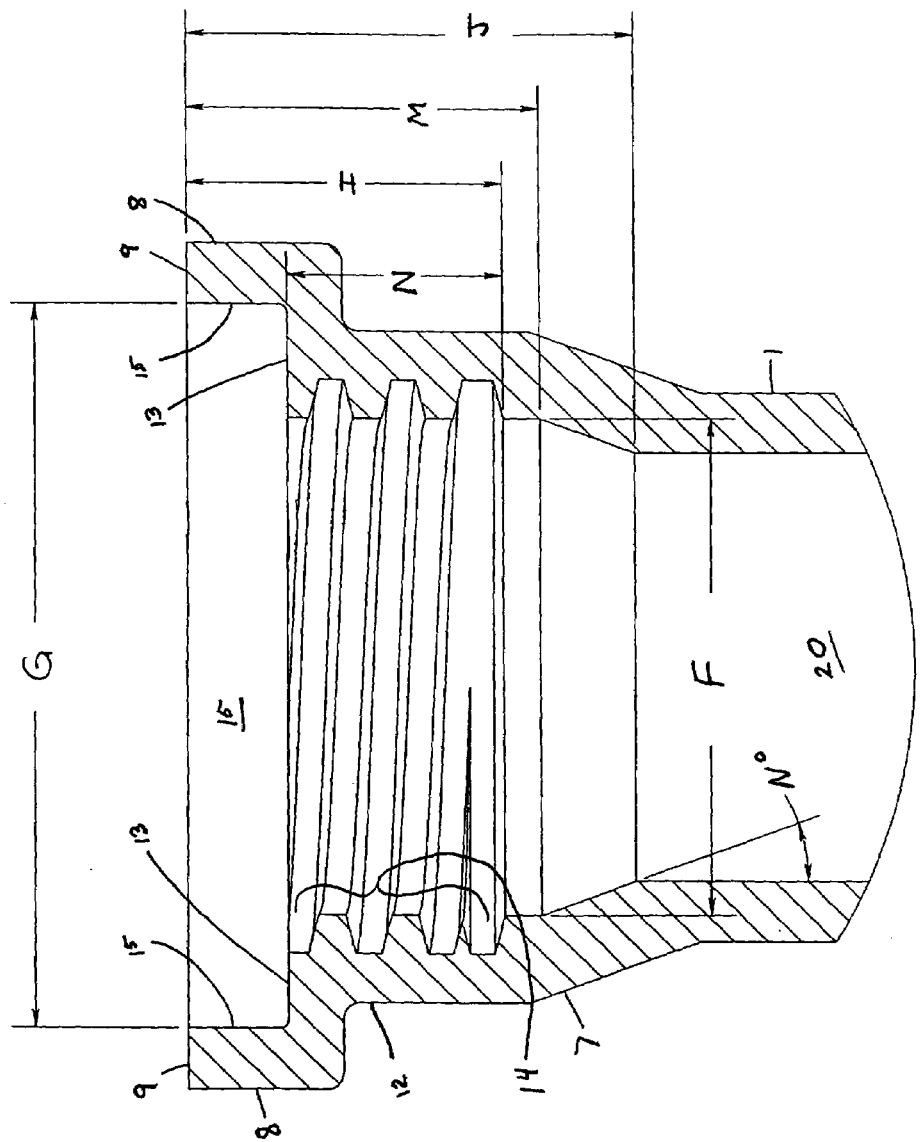
FIG. 10 shows an enlarged view of the cross-section shown in FIG. 9, identified by the encircled area 10-10'.

FIG. 10 shows an enlarged view of the cross-section portion shown in FIG. 9, identified by the encircled area 10-10'. As shown in FIG. 10, threads 14 are defined in the upper portion 12 of the body 1. In the example of FIG. 10, the length of the threads is given by the distance N. In one embodiment, the distance N is in the range of 0.5 to 1.0 inches. In one particular embodiment, the distance N is 0.75 inches. The distance from the top surface 9 of the rim 8 to the bottom of the threads 14 is shown by the distance M in the example of FIG. 10. In one embodiment, the distance M is in the range of 1.0 to 1.5 inches. In one particular embodiment, the distance M is approximately 1.23 inches.

FIG. 11 shows a top view of the wedge portion 2 of the anchor 10. The wedge portion 2 includes an upper surface 21 having defined therein four holes 22. The holes 22 are generally spaced evenly along the circumference of the upper surface 21 in this example. The wedge portion 2 defines an interior cavity 25. In use, the interior cavity 25 of the wedge portion 2 generally aligns with the cylindrical cavity 20 of the anchor body 1, and the support member passes through.

FIG. 12 shows a cross-section of the wedge portion 2 shown in FIG. 11, taken along the line 12-12'. The upper portion of the wedge portion 2 extends outward and has an outer side 29. A sidewall 32 defines the interior cavity 25 of the wedge portion 2. In the example of FIG. 12, the holes 22 extend through the upper portion from the upper surface 21 to the bottom surface 23 of the wedge portion 2. Corners 26, 27, 28 of the wedge portion 2 are chamfered in this example. In the example of FIG. 12, the threads 30 of the wedge portion 2 extend a distance T along the sidewall 32. The distance from the upper surface 21 to lower surface 23 is given by S in the example of FIG. 12. In one example, the distance S is in the range of 0.30 to 0.325 inches. In one particular embodiment, the distance S is approximately 0.132 inches. The inner diameter of the cavity 25 of the wedge portion 2 is approximately the same diameter as the inner diameter of the cylindrical cavity 20 of the body 1 shown in FIG. 7. The inner diameter P is approximately 1.515 to 1.520 inches in 1 embodiment period. The outer diameter of the threads 30 is given by the distance Q in the example of FIG. 12. In one example, the distance Q is in the range of 1.988-2.000 inches. In one particular example, the distance Q is approximately 1.994 inches. The outer diameter of the upper portion of the wedge portion 2 is given by the distance R in the example of FIG. 12. In one example, the distance R is approximately 2.5 inches.

FIG. 13 shows a side view of the wedge portion 2. As shown in FIG. 13, the upper portion includes an outer sidewall 29 that generally runs around the outside of the wedge portion 2. The outer side 29 has a chamfered corner 27. Similarly, the lower end of the wedge portion 2 shown in FIG. 13 shows a chamfered corner 28. Threads 30 extend outward from the sidewall 32 and are adapted to engage similar threads inside the body portion (14 in FIG. 9). In one example, the threads are 2-4 acme-2G threads. The initial thread and the final thread may be trimmed to have a thickness of 0.03 inches in one example. In one example, the body 1 and the edge portion 2 of the anchor 10 are both formed from a stainless steel. In this example, the use of the acme threads has been shown to prevent the threads 30 on the wedge portion 2 from seizing with threads 14 on the body 1, as may otherwise occur with stainless steel connections using different types of threads.

Figure 14:
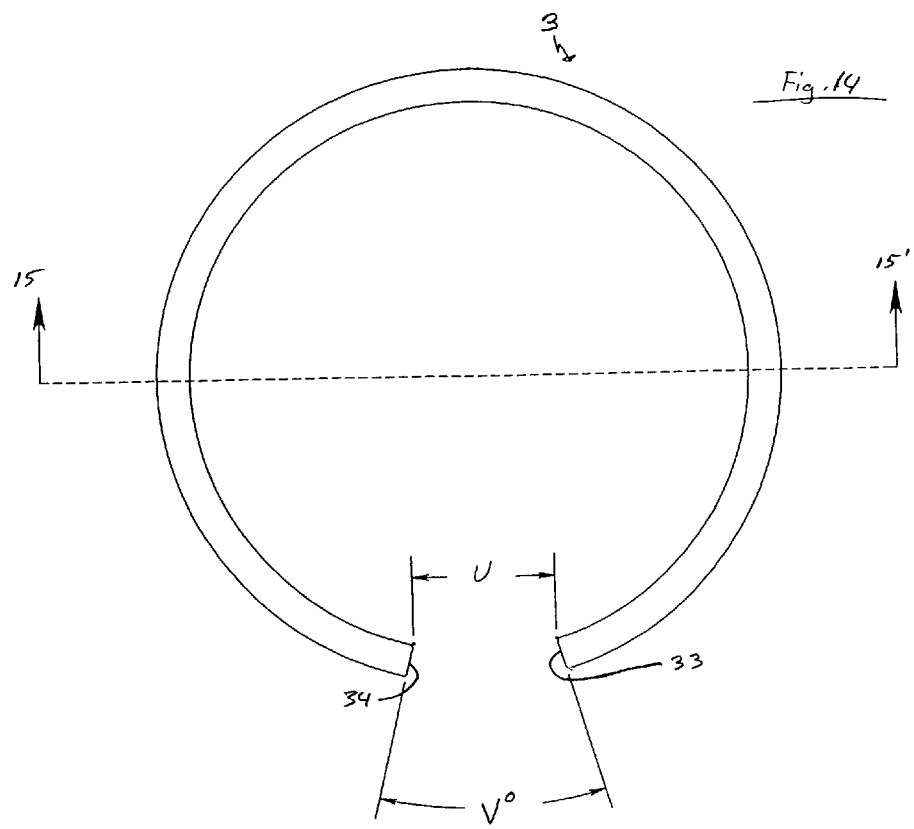
FIG. 14 shows a compression ring.

FIG. 14 shows a compression ring 3. The compression ring 3 has first and second ends 33, 34 separated by a distance U when the ring 3 is at rest (i.e., when no force is exerted compressing the ring 3). In one example, the distance U is in the range of 0.25 to 0.75 inches. In one particular embodiment, the distance U is approximately 0.409 inches. The ends 33, 34 may be cut substantially perpendicular to the ends of the ring 3. An angle V is formed between the sides of the ends 33, 34. In one example, the angle V is in the range of 20 to 40 degrees. In one particular embodiment, the angle V is approximately 30 degrees.

Figure 15:
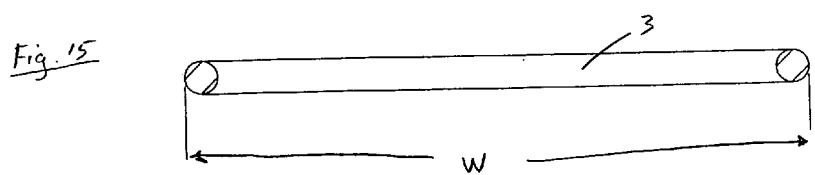
FIG. 15 shows a cross-section of the compression ring 3 shown in FIG. 14, taken along the line 15-15'.

FIG. 15 shows a cross-section of the compression ring 3 shown in FIG. 14, taken along the line 15-15'. As shown in FIG. 15, the ring 3 has a diameter W. In one example, the diameter W is in the range of 1.5 to 2.0 inches. In one particular embodiment, the distance W is approximately 1.776 inches. The ring 3 is formed from a stainless steel spring wire. In one example, the wire has an outside diameter of approximately 0.0915 inches and is a type 316 spring stainless steel wire.

Figure 16:
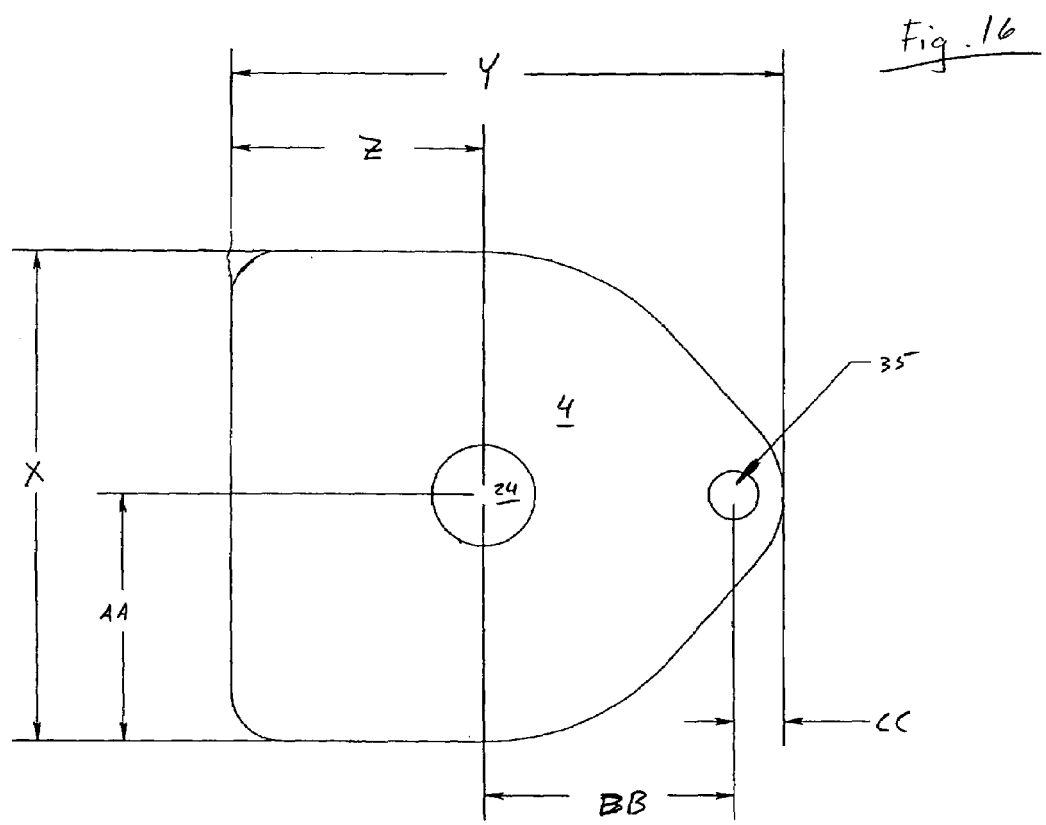
FIG. 16 shows a top view of a base plate next to a lower of the body of the anchor.

FIG. 16 shows a top view of a bottom plate 4 next to a lower end 11 of the body 1 of the anchor 10. The bottom plate 4 has a hole 24 defined therein. In use, the hole 24 is generally in communication with, and may be aligned concentric with, the cylindrical cavity 20 of the body 1. The bottom plate 4 also defines a hole 35 for receiving a grounding screw (5 in FIG. 1). The hole 35 may be tapped for this purpose. In the example of FIG. 16, various dimensions of the bottom plate 4 are illustrated. The bottom plate 4 has widths X and Y. In one example, the width X is approximately 2.5 inches and the width Y is approximately 2.75 inches. The center of the hole 24 is spaced from one side by a distance Z and by another side by the distance AA. In one example, the distances Z and AA are both 1.25 inches. The center of the hole 24 is spaced by a distance BB from the center of the hole 35. In one example, the distance BB is approximately 1.25 inches. The center of the hole 35 is spaced from the other side of the bottom plate 4 by a distance CC. In one example, the distance CC is approximately 0.25 inches.

Figure 17:
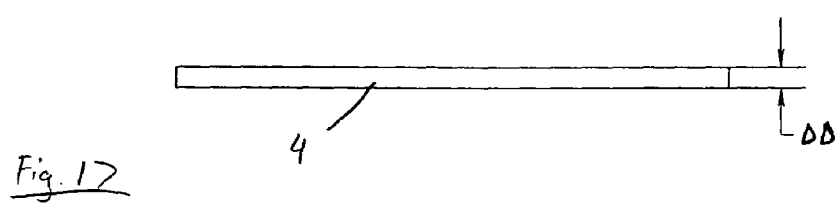
FIG. 17 shows a side view of the plate.

FIG. 17 shows a side view of the bottom plate 4. As shown in FIG. 17, the bottom plate 4 has a width given by the letters DD. In one example, the thickness DD is approximately 0.10 inches.

FIG. 18 shows a perspective view of another embodiment of the anchor 10 with an anti-rotation tab 50 positioned approximately midway along the length of the body 1. In use, the anchor 10 is embedded into a ground surface, or other surface, for example by pouring concrete or other foundation substrate around the anchor 10. To move the wedge portion 2 relative to the body 1, a user exerts a torsional force about a longitudinal axis of the anchor 10 using a key (not shown). The anti-rotation tab 50 is a flange that extends outward from the anchor body 1. Anti-rotation tab 50 prevents the anchor 10 from rotating relative to the ground, or other surface, in response to the torsional force. In the example of FIG. 18, the grounding screw 5 is connected to the anti-rotation tab. Also in this example, the bottom plate (not shown in FIG. 18) is round and does not extend beyond the walls of the body 1.

FIG. 19 shows a side view of the anchor 10 shown in FIG. 18. As shown, the anti-rotation tab 50 extends outward from the body 1 of the anchor 10, and the grounding screw is connected to the anti-rotation tab 50.

Figure 20:
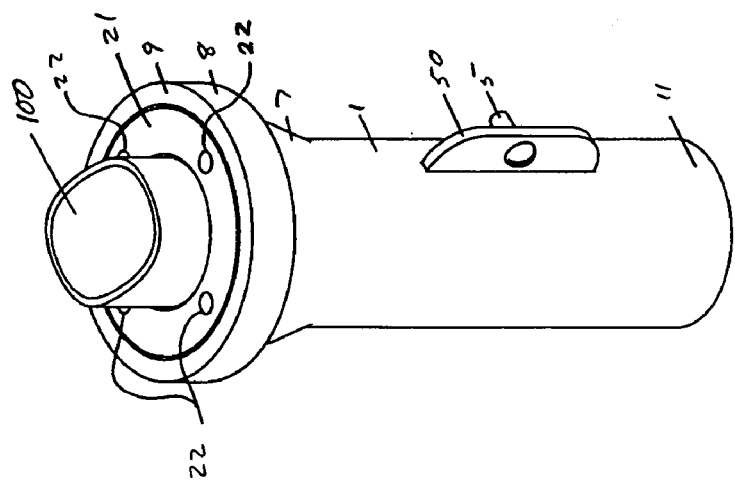
FIG. 20 shows a perspective view of the anchor shown in FIG. 18, including a portion of a support member positioned in the anchor.
Figure 21:
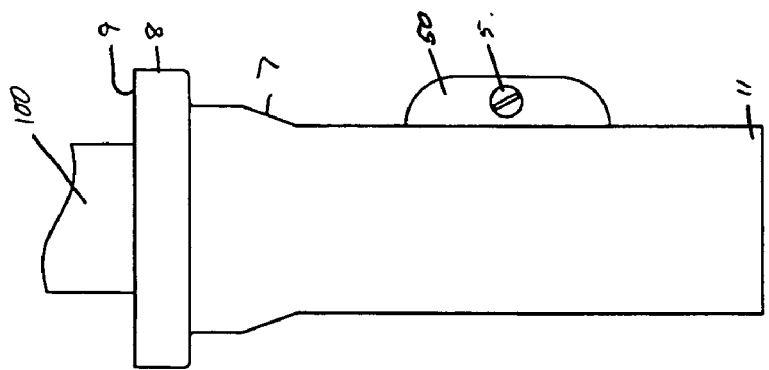
FIG. 21 shows a side view of the anchor and the support member shown in FIG. 20.

FIG. 20 shows a perspective view of the anchor shown in FIG. 18, including a portion of a support member 100 positioned in the anchor 10. FIG. 20 generally illustrates the position of the support member 10 when the support member 100 is received in the cylindrical cavity (20 in FIG. 18) of the anchor. FIG. 21 shows a side view of the anchor 10 and the support member 100 shown in FIG. 20.

FIG. 22 shows a top view of the anchor 10 and support member 100 shown in FIGS. 20 and 21. As shown in FIG. 22, the support member 100 fits snugly in the anchor 10.

FIG. 23 shows a cross-section of the anchor 10 and support member 100 shown in FIG. 22, taken along the line 23-23'. In the example of FIG. 23, a hole 51 in the anti-rotation tab 50 receives a grounding screw (5 in FIG. 18). In the particular example of FIG. 23, the bottom plate 52 is substantially circular and does not extend beyond the side walls of the body 1. In the particular embodiment of FIG. 23, the support member 100 is spaced apart from the body 1 and the bottom plate 52 of the anchor 10. The walls of the body 1 include spacers 54, 55 that are wider portions of the body 1, having smaller inside diameters than the rest of the body 1, thereby creating spaces between the support member 100 and the walls of the body 1. Also, the body includes a spacer 53 that contacts the received support member 100 near the bottom of the body. In the example of FIG. 23, the spacer 53 is a chamfered bottom corner formed at the lower corners of the body 1, where the lower portion 11 of the body 1 meets the bottom plate 52. The chamfered bottom corner forms a centering cone that spaces the lower end 101 of the support member 100 from the bottom plate 52 and from the side walls of the lower portion 11 of the body 1. In so doing, the spacer 53 (the centering cone in this example) provides added stability to the support member 100.

FIG. 24 shows a more detailed view of the chamfered bottom corner 53 shown in FIG. 23. In the particular embodiment of FIG. 24, the spacer 53 forms a 45-degree angle relative to the bottom plate 52 and the lower portion 11 of the body 1. The lower end 101 of the support member 100 contacts the spacer 53 in the example of FIG. 24.

FIG. 25 shows a more detailed view of one of the spacers 54 that extends into the cylindrical cavity (20 in FIG. 18) and abuts the support member 100. In one embodiment, edges of the spacer 54 taper at a 30-degree angle.

FIG. 26 shows a bottom view of a key 200 used to rotate the wedge portion 2 relative to the body 1 of the anchor 10. The key 200 includes a handle 202 and an engagement portion 204 connected to the handle 202. The engagement portion 204 includes two curved, extended members 216. Three pins 220 are connected at the engagement portion 204. In use, the pins 220 engage respective holes 22 of the wedge portion 2. The curved, extended members 216 allow the pins 220 of the key 200 to engage the holes 22, by wrapping around the support member (100 in FIG. 20) in a semicircle shape.

The handle 202 in the example of FIG. 26 is bent in the embodiment of FIG. 26. The handle 202 includes a first flat portion 210, a second flat portion 212 that forms a 30-degree angle with respect to the first flat portion 210, and a third flat portion 214 parallel to the first flat portion 210. This provides the user more room to maneuver the key 200.

FIG. 27 shows a side view of the key 200 shown in FIG. 26. As shown, the pins 220 extend outward from the curved, extension portions 216 and engage the holes 22 of the wedge portion 2. The first flat portion 210 is spaced from the third flat portion 214 by a distance EE. In one embodiment, the distance EE is in the range of 1.25-2.00 inches. In one particular embodiment, the distance EE is 1.59 inches. The length of the handle 202 is shown by the distances FF, GG, and HH. In one embodiment, the distance FF is approximately 4.75 inches, the distance GG is approximately 2.75 inches, and the distance GG is approximately 3.5 inches.

In use, the key 200 is used to exert a torque on the wedge portion 30, thereby turning the wedge portion 30 relative to the body 20. The pins 220 on the key 200 engage the holes 22 on the upper surface 21 of the wedge portion 30. The user then turns the handle 202 to exert a torque on the wedge portion 30.

To engage a support member 100 in the anchor 10, the wedge portion 30 is fitted loosely into the threads of the body 1. The support member 100 is inserted though the cavity 25 of the wedge portion 30 and into the cavity 20 of the body 1. The lower end 101 of the support member 100 contacts the spacer 53 at the bottom 11 of the body 1. The key 200 then engages the wedge portion 30 using the pins 220 and holes 22. The key 200 turns the wedge portion 30 relative to the body 1 in a first direction (e.g., clockwise), thereby tightening the compression ring 3 around the support member 100. When the wedge portion 30 is tightened into place, the upper surface 21 of the wedge portion 30 is substantially flush with the upper surface 9 of the body 1 of the anchor 10.

To remove the support member 100 from the anchor 10, the key 200 engages the holes 22 in the wedge portion 30 and turns the wedge portion 30 in a second direction (e.g., counterclockwise) relative to the body 1. This loosens the compression ring 3, thereby releasing the support member 100 so that the support member 100 may be removed from the anchor 10.

Although the present invention has been described with respect to particular embodiments thereof, variations are possible. The present invention may be embodied in specific forms without departing from the essential spirit or attributes thereof. It is desired that the embodiments described herein be considered in all respects illustrative and not restrictive and that reference be made to the appended claims and their equivalents for determining the scope of the invention.

What is claimed is:

1. An anchor comprising:
   a body defining a cavity, wherein the body has top and bottom ends;
   a wedge portion that connects to the body using threads, wherein the wedge portion encircles a support member received in the cavity and includes an upper surface having holes defined therein, wherein the holes receive pins on a key used to turn the wedge relative to the body, using the threads; and
   a compression ring disposed in the cavity, wherein the compression ring expands and contracts in response to movement of the wedge portion relative to the body.

2. The anchor of claim 1, wherein the wedge portion and the body are formed from a stainless steel.

3. The anchor of claim 1, wherein the upper surface of the wedge portion includes at least three holes, wherein two of the holes are disposed opposite each other, on either side of the support member when the support member is received in the cavity.

4. The anchor of claim 1, wherein the wedge portion includes a substantially flat upper surface that is substantially flush with a substantially flat upper rim of the body when the anchor engages the support member and the upper surface of the wedge portion and the rim of the body are positioned to be substantially flush with a ground surface in which the anchor may be positioned.

5. The anchor of claim 1, wherein the cavity has a diameter in the range of 1.4-1.6 inches.

6. The anchor of claim 1, further comprising a means for preventing the body from rotating relative to a ground surface in which the anchor is mounted, when the wedge is turned relative to the body.

7. The anchor of claim 1, further comprising an anti-rotation tab connected to the body.

8. The anchor of claim 7, wherein the anti-rotation tab comprises an electrical grounding means.

9. The anchor of claim 7, further comprising a grounding screw connected to the anti-rotation tab.

10. The anchor of claim 7, wherein the anti-rotation tab is connected to the body approximately midway between the top and bottom ends of the body.

11. The anchor of claim 1, further comprising:
a bottom plate connected to the bottom end of the body; and
a spacer positioned inside the cavity at a connection between the bottom plate and the bottom end of the body, wherein the spacer spaces the support member away from the bottom portion when the support member is received in the cavity.

12. The anchor of claim 11, wherein the spacer comprises a chamfered bottom corner that contacts a lower end of the support member when the support member is received in the cavity.

13. The anchor of claim 1, further comprising a spacer disposed in the cavity, wherein the spacer abuts the support member received in the cavity and spaces the support member away from other portions of the body.

14. An anchor for supporting a cylindrical support member, comprising:
means for receiving the support member;
means for releasably securing the support member received in the anchor by compressing a compression ring around the support member in response to a torsional force exerted on the means for receiving, wherein the compression ring and said means for releasably securing are disposed within the means for receiving, wherein the compression ring compresses as it moves laterally relative to a longitudinal axis of the anchor in response to movement of the means for releasably securing relative to the means for receiving; and
means for preventing the anchor from moving relative to a ground surface in which the support member is positioned, in response to the torsional force.

15. The anchor of claim 14, further comprising means for centering a lower end of the support member within the anchor.

16. The anchor of claim 14,
wherein the means for receiving and the means for securing are both formed from a stainless steel; and
wherein the means for receiving engages the means for securing via threads; and
further comprising means for preventing the means for receiving from forming a permanent bond with the means for securing, at the threads.

17. An anchor comprising:
a body that defines a cylindrical cavity having a length in the range of 4-6 inches; and
a wedge portion that connects to the body, wherein the wedge portion includes an upper surface having a plurality of holes defined therein, wherein the holes receive complementary pins on a key that is used to rotate the wedge portion relative to the body, and wherein the wedge portion is disposed within the cavity and encircles a support member received in the cavity, and wherein the upper surface of the wedge portion is substantially flush with an upper end of the body when the support member is received and secured in the cavity.

18. The anchor of claim 1, wherein the wedge portion is disposed within the cavity.

19. The anchor of claim 1,
wherein the body includes a tapered interior wall proximate the top end, and
wherein the compression ring is disposed within the cavity in contact with the tapered interior wall.

20. The anchor of claim 1, wherein the compression ring moves laterally relative to a longitudinal axis of the cavity in response to movement of the wedge portion.

21. The anchor of claim 1, wherein the compression ring comprises an elongated, contiguous piece of material separate from the body, having first and second ends and being shaped to encircle the support member that is received in the cavity, wherein the compression ring contacts the support member to connect the support member to the anchor.

22. An anchor comprising:
a body defining a cavity, wherein the body has top and bottom ends;
a wedge portion that connects to the body using threads, wherein the wedge portion encircles a support member received in the cavity and includes an upper surface having holes defined therein, wherein the holes receive pins on a key used to turn the wedge relative to the body, using the threads; and
a compression ring disposed in the cavity, wherein the compression ring expands and contracts in response to movement of the wedge portion relative to the body.

23. The anchor of claim 22,
wherein the wedge portion is disposed within the cavity,
wherein the body defines a tapered interior sidewall within the cavity proximate the top end of the body, and
wherein the compression ring is a separate, contiguous piece of material that encircles the received support member, contacts the tapered interior sidewall, and contracts and expands as it moves laterally along a longitudinal axis of the cavity in response to movement of the wedge portion relative to the body.

24. The anchor of claim 17, further comprising a compression ring disposed within the cavity that moves laterally relative to a longitudinal axis of the cavity in response to movement of the wedge portion relative to the body, to thereby expand and contract around the received support member.

25. An anchor comprising:
a body defining a cavity, wherein the body has top and bottom ends;
a wedge portion that connects to the body using threads, wherein the wedge portion encircles a support member received in the cavity;

a compression ring disposed in the cavity, wherein the compression ring expands and contracts in response to movement of the wedge portion relative to the body; and a means for preventing the body from rotating relative to a ground surface in which the anchor is mounted, when the wedge is turned relative to the body.

26. An anchor comprising:

a body defining a cavity, wherein the body has top and bottom ends;

an anti-rotation tab connected to the body, wherein the anti-rotation tab comprises an electrical grounding means;

a wedge portion that connects to the body using threads, wherein the wedge portion encircles a support member received in the cavity; and a compression ring disposed in the cavity, wherein the compression ring expands and contracts in response to movement of the wedge portion relative to the body.

27. The anchor of claim 26, wherein the electrical grounding means comprises a grounding screw connected to the anti-rotation tab.

28. An anchor comprising:

a body defining a cavity, wherein the body has top and bottom ends;

a bottom plate connected to the bottom end of the body; and a spacer positioned inside the cavity at a connection between the bottom plate and the bottom end of the body, wherein the spacer spaces the support member away from the bottom plate when the support member is received in the cavity;

a wedge portion that connects to the body using threads, wherein the wedge portion encircles a support member received in the cavity; and a compression ring disposed in the cavity, wherein the compression ring expands and contracts in response to movement of the wedge portion relative to the body.

29. The anchor of claim 28, wherein the spacer comprises a chamfered bottom corner that contacts a lower end of the support member when the support member is received in the cavity.

30. An anchor comprising:

a body defining a cavity, wherein the body has top and bottom ends;

a wedge portion that connects to the body using threads, wherein the wedge portion encircles a support member received in the cavity; and a spacer disposed in the cavity, wherein the spacer abuts the support member received in the cavity and spaces the support member away from other portions of the body; and a compression ring disposed in the cavity, wherein the compression ring expands and contracts in response to movement of the wedge portion relative to the body.

* * * * *